(12) United States Patent
Pannek

(10) Patent No.: US 8,558,680 B2
(45) Date of Patent: Oct. 15, 2013

(54) METHOD FOR DETERMINING A VEHICLE TIRE TREAD DEPTH

(75) Inventor: Thorsten Pannek, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 12/735,438

(22) PCT Filed: Nov. 17, 2008

(86) PCT No.: PCT/EP2008/065680
§ 371 (c)(1),
(2), (4) Date: Jul. 16, 2010

(87) PCT Pub. No.: WO2009/095113
PCT Pub. Date: Aug. 6, 2009

(65) Prior Publication Data
US 2010/0295669 A1  Nov. 25, 2010

(30) Foreign Application Priority Data
Jan. 29, 2008 (DE) .......................... 10 2008 006 566

(51) Int. Cl.
*B60Q 1/00* (2006.01)
*B60C 23/10* (2006.01)
*E01C 23/00* (2006.01)
*G01B 3/44* (2006.01)

(52) U.S. Cl.
USPC ................ 340/438; 152/415; 73/146; 702/34

(58) Field of Classification Search
USPC ................ 340/438; 152/415; 73/146; 702/34
See application file for complete search history.

(56) References Cited

U.S. PATENT DOCUMENTS

| | | | |
|---|---|---|---|
| 3,707,701 A * | 12/1972 | Neu ............................. | 340/444 |
| 5,749,984 A | 5/1998 | Frey et al. | |
| 2004/0154715 A1* | 8/2004 | Dufournier ............... | 152/154.2 |
| 2005/0178193 A1* | 8/2005 | Kuchler ....................... | 73/146 |
| 2008/0015763 A1* | 1/2008 | Kitazaki et al. ............. | 701/70 |
| 2008/0016955 A1* | 1/2008 | Merino-Lopez et al. ....... | 73/146 |
| 2008/0027658 A1* | 1/2008 | Ichikawa et al. ............. | 702/34 |
| 2008/0168833 A1* | 7/2008 | Awad .......................... | 73/146 |
| 2009/0000370 A1* | 1/2009 | Lionetti et al. .............. | 73/146 |
| 2009/0078347 A1* | 3/2009 | Niklas et al. ............. | 152/154.2 |

FOREIGN PATENT DOCUMENTS

| | | |
|---|---|---|
| DE | 103 04 126 | 8/2004 |
| DE | 10 2006 02841 | 12/2007 |
| EP | 1 759 891 | 3/2007 |

* cited by examiner

*Primary Examiner* — George Bugg
*Assistant Examiner* — Jack K Wang
(74) *Attorney, Agent, or Firm* — Kenyon & Kenyon LLP

(57) ABSTRACT

A method is described for determining a vehicle tire tread depth using at least one sensor situated in or on the vehicle tire, the tire tread depth being determined as a function of a tire contact area detected by the sensor.

13 Claims, 1 Drawing Sheet

METHOD FOR DETERMINING A VEHICLE TIRE TREAD DEPTH

FIELD OF THE INVENTION

The present invention relates to a method for determining a vehicle tire tread depth.

BACKGROUND INFORMATION

German printed patent publication DE 103 04 126 A1, for example, discusses an electronic device for measuring a tire tread depth and a pressure loss of a vehicle tire, a reference value of a distance traveled being compared to the wheel revolutions of an ABS wheel speedometer sensor system and the actual tire diameter and the tread depth being inferred on the basis of correlation algorithms. A disadvantage is that this method and respectively this device is too inaccurate to allow for a comparatively precise and reliable determination of the vehicle tire tread depth.

SUMMARY OF THE INVENTION

The method of the present invention for determining a vehicle tire tread depth in accordance with the independent claims has the advantage over the related art that it allows for the tire circumference to be determined directly in a particularly simple manner using only one single sensor. This is achieved by the fact that the sensor measures both the tire revolution time of the vehicle tire as well as the tire contact time. The tire revolution time is proportional to the tire circumference, while the tire contact time is essentially constant even when the tire circumference changes and/or the change of the tire contact time is less than the change of the tire revolution time since the tire contact time in the first approximation depends primarily on the weight of the vehicle. The change in the proportion of the tire contact time to the tire revolution time is thus a measure for the changing tire circumference. The sensor may be situated in a tire section that has a radius unequal to zero with respect to the tire axle such that a sensor tire section denotes a section of a tire tread that has an overlap with the sensor in the radial direction of the vehicle tire. In the sense of the present invention, the tire contact area comprises an area of a contact region between the vehicle tire and a roadway. The tire contact time and the tire revolution time are measured for example by measuring an action of force on the sensor, the sensor tire section in a first time interval being in the tire contact area such that essentially the force of gravitation acts on the sensor and the sensor tire section in a second time interval being outside of the tire contact area such that essentially a centrifugal force caused by the rotation of the vehicle tire acts on the sensor. The first time interval thus comprises the tire contact time, while a sum of the first and the second time interval comprises the tire revolution time. The first, the second and/or the sum of the first and the second time interval are determined by measuring time values at points in time at which the action of force on the sensor exhibits a comparatively great change, i.e. in a transitional range from the gravitational force to the centrifugal force or vice versa. In a particularly advantageous manner, the measurement of the tire contact area additionally makes it possible to determine the loading state of the vehicle.

According to another exemplary embodiment, for determining the average vehicle tire tread depth, an average is formed over many individual determinations of the vehicle tire tread depths such that the accuracy of the tire tread depth determination is increased in a particularly advantageous manner. In particular, an averaging over many individual determinations is provided, which are ascertained by different measuring methods.

According to another exemplary embodiment, the vehicle tire tread depth is determined as a function of first correction data of a memory, the memory having characteristic curves for the vehicle tire and the characteristic curves may include information regarding the dimensions, rolling properties, rolling radius changes and factory tire tread depths of various tire types. Particularly advantageously, this information about the vehicle tire allows for a correction of the tire tread depth so as to increase its accuracy. In particular, the dimension information of a new tire makes it possible to determine or detect an absolute tire tread depth, for example of a minimum tread depth of 1.6 mm. Furthermore, a changing rolling radius of the vehicle tire is taken into account.

According to another exemplary embodiment, the vehicle tire tread depth is determined as a function of second correction data of a tire pressure sensor. In addition to depending on the vehicle's weight, the tire contact area or tire contact time has a comparatively low dependence on the tire pressure such that taking into account the tire pressure with the aid of a tire pressure sensor advantageously increases the accuracy of the vehicle tire tread depth determination.

According to another exemplary embodiment, the vehicle tire tread depth is determined as a function of third correction data, the third correction data comprising differences between the tire revolution times of a plurality of tires of the vehicle, which occur in particular in a steering operation. Advantageously, another correction of the tire tread depth is thus effected since in particular when cornering the tire revolution time of the vehicle tires may vary independently of a tire circumference change.

According to another exemplary embodiment, the vehicle tire tread depth is determined as a function of fourth correction data of a traction control system, of inclination sensors and/or of displacement sensors such that advantageously an additional correction of the tire tread depth may be achieved to increase its accuracy. In particular, the correction data of the inclination sensors allow for a detection of the loading state of the vehicle, which has a comparatively great influence on the size of the tire contact area and thus on determining the tread depth.

According to another exemplary embodiment, the vehicle tire tread depth is communicated to a driver, a warning signal is produced when the vehicle tire tread depth falls below a limit value and/or a maximum range of the vehicle is determined and/or communicated to the driver before the vehicle tire tread depth falls below the limit value. In a particularly advantageous manner, the driver is thus constantly informed about the current tire tread depth of his vehicle, in particular visually and/or acoustically, such that the accident and breakdown risk as a result of tire damage and/or lack of tire tread depth is significantly reduced. Furthermore, on the basis of the calculation of the remaining maximum range, the driver is able to plan an impending tire change early, in particular prior to longer trips.

According to another exemplary embodiment, the vehicle tire tread depth is determined in a central control unit, which may receive the tire revolution time, the speed value, the tire contact area, the average value, the vehicle tire tread depth, the range, the limit value, the warning signal, the first correction data, the second correction data and/or the third correction data inductively and/or electromagnetically. In a particularly advantageous manner, the central control unit may thus be situated in a location in the motor vehicle that is comparatively easy to reach and/or inexpensive to contact, in particular by supply lines. Such a wireless transmission of the data also allows for the sensors to be situated at a distance from the control unit such that in particular an acceleration sensor may be situated in the tire of the vehicle.

Another subject matter of the exemplary embodiments and/or exemplary methods of the present invention is a sensor system for determining a vehicle tire tread depth, in particular for implementing a method as recited in one of the preceding claims, the sensor being situated in or on a vehicle tire and detecting the tire contact time of the vehicle tire and the sensor may include an acceleration sensor. As described above, an acceleration sensor fastened in the sensor tire section of a vehicle tire allows for the tire contact time and/or the tire revolution time to be determined by time measurement when comparatively great changes of actions of force on the sensor occur. Advantageously, a vehicle tire tread depth determination using only one single sensor is thus realized that has a markedly increased precision compared to the related art.

DETAILED DESCRIPTION

Figure 1:
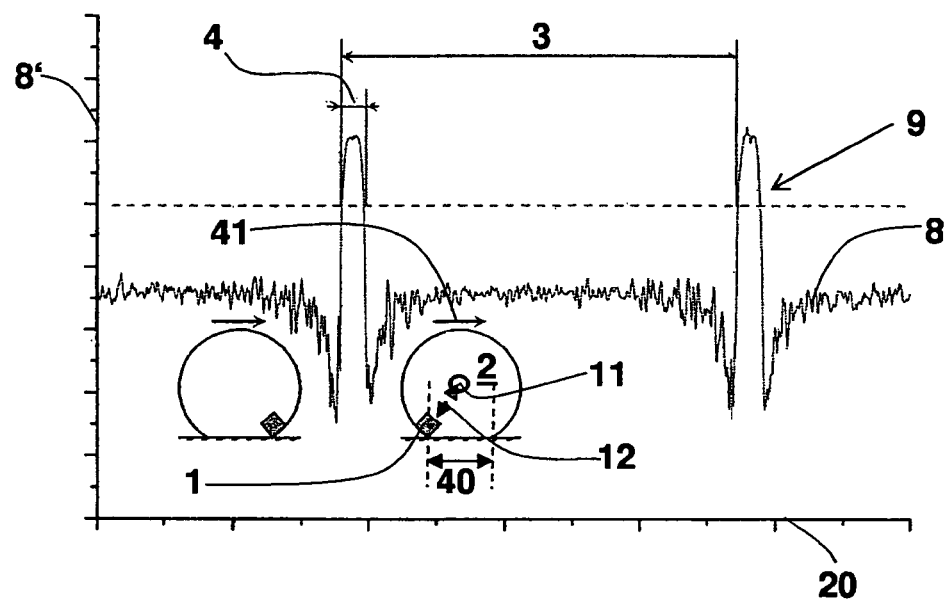
FIG. 1 shows a schematic graphical representation of an action of force on an acceleration sensor in a method according to an exemplary specific embodiment of the present invention.

FIG. 1 shows a schematic graphical representation of an action of force on an acceleration sensor in a method according to an exemplary specific embodiment of the present invention, an acceleration sensor 1 being situated in a region of a vehicle tire 2, which has a radius 12 greater than zero with respect to a tire axle 11 such that sensor 1 is located in particular in the region of a tire tread 17. A tire contact area 40 is formed by a contact region between tire tread 17 and a road surface 18. A sensor tire section includes a section of tire tread 17, which overlaps sensor 1 essentially in a radial direction, parallel to radius 12. If the sensor tire section is situated in tire contact area 40 as a result of a tire rotation 41 about tire axle 11, then essentially the gravitational force (1 g) acts on sensor 1, while essentially a centrifugal force 37 caused by tire rotation 41 acts on sensor 1 as soon as the sensor tire section is situated outside of tire contact area 40. The graphical representation shows the curve of action of force 8 on sensor 1 over a unit of time, an action of force scale being plotted on an ordinate 8' and a time scale being plotted on an abscissa 20. In a transition of the sensor tire section into tire contact area 40 and in a transition of the sensor tire section out of tire contact area 40, curve of action of force 8 respectively undergoes a comparatively great change 9, a difference of the points in time between an entry 20' and an exit 20" of the sensor tire section into or out of tire contact area 40 representing the first time interval or the tire contact time 4 and a difference of the points in time between the entry 20' and another subsequent entry 20''' of the sensor tire section into tire contact area 40 representing the sum of the first and a second time interval or tire revolution time 3. The great action of force changes 9 become detectable in a comparatively simple manner in particular by a mathematical derivation of action of force curve 8. Tire revolution time 3 is proportional to the tire circumference, while tire contact time 4 is essentially constant even when the tire circumference changes. The change in the proportion of tire contact time 4 to tire revolution time 3 is thus a measure for the changing tire circumference and hence for the tire tread depth. With the aid of dimension information about the brand-new vehicle tire, i.e. about the tire circumference having the maximum tire tread depth, it is possible to convert the tire tread depth into an absolute tire tread depth value. Using correction data, which take into account for example the loading of the vehicle and/or the tire pressure, a correction of the determined tire tread depth may be provided for increasing the accuracy.

What is claimed is:

1. A method for determining a vehicle tire tread depth, the method comprising:
    determining a tire contact area using at least one sensor, which is situated in or on the vehicle tire, wherein the tire contact area is an area of contact between the vehicle tire and a roadway; calculating a tire revolution time based on an amount of time that a section of the tire containing the at least one sensor spends in the tire contact area; and determining the tire tread depth as a function of the tire contact area.

2. The method of claim 1, wherein the vehicle tire tread depth is calculated as a function of the tire revolution time and the tire contact area.

3. The method of claim 1, wherein to calculate the average vehicle tire tread depth, an average is formed over many individual determinations of the vehicle tire tread depths.

4. The method of claim 1, wherein the vehicle tire tread depth is calculated as a function of second correction data of a tire pressure sensor.

5. The method of claim 1, wherein the vehicle tire tread depth is calculated as a function of third correction data, the third correction data including differences between the tire revolution times of a plurality of tires of the vehicle, which occur in a steering operation.

6. The method of claim 1, wherein the vehicle tire tread depth is calculated as a function of fourth correction data of at least one of a traction control system, inclination sensors and displacement sensors.

7. The method of claim 1, wherein the vehicle tire tread depth is communicated to a driver, and wherein a warning signal is communicated one of (i) when the vehicle tire tread depth falls below at least one of a limit value and a maximum range of the vehicle is determined, and (ii) before the vehicle tire tread depth falls below the limit value.

8. A method for determining a vehicle tire tread depth, the method comprising:
    determining a tire contact area using at least one sensor, which is situated in or on the vehicle tire; and determining the tire tread depth as a function of the tire contact area; wherein the vehicle tire tread depth is determined as a function of first correction data of a memory, the memory having characteristic curves for the vehicle tire, and wherein the characteristic curves include information regarding dimensions, rolling properties, rolling radius changes and factory tire tread depths of various tire types.

9. A method for determining a vehicle tire tread depth, the method comprising:
    determining a tire contact area using at least one sensor, which is situated in or on the vehicle tire; and determining the tire tread depth as a function of the tire contact area; wherein the vehicle tire tread depth is determined in a central control unit, which receives inductively or electromagnetically a tire revolution time, the speed value, the tire contact area, an average value, the vehicle tire tread depth, a range, a limit value, a warning signal, first correction data, second correction data, and third correction data.

10. A sensor system for determining a vehicle tire tread depth of a vehicle tire, comprising:

at least one sensor situated in or on the vehicle tire; and a determining arrangement to determine: a tire contact area based on an output of the at least one sensor, wherein the tire contact area is an area of contact between the vehicle tire and a roadway; a tire revolution time based on an amount of time that a section of the tire containing the at least one sensor spends in the tire contact area; and the tire tread depth as a function of the tire contact area.

11. The sensor system of claim 10, wherein the at least one sensor includes an acceleration sensor.

12. The sensor system of claim 10, wherein the tire contact area corresponds to an area of contact between the vehicle tire and a roadway.

13. A method for calculating a vehicle tire tread depth, the method comprising:
identifying a tire contact area corresponding to an area of contact between the vehicle tire and a roadway, using at least one sensor situated in or on the vehicle tire; calculating a tire revolution time based on an amount of time that a section of the tire containing the at least one sensor spends in the tire contact area; and calculating the tire tread depth as a function of the tire contact area.

* * * * *

UNITED STATES PATENT AND TRADEMARK OFFICE
CERTIFICATE OF CORRECTION

PATENT NO. : 8,558,680 B2  Page 1 of 1
APPLICATION NO. : 12/735438
DATED : October 15, 2013
INVENTOR(S) : Thorsten Pannek It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 386 days.

Signed and Sealed this
Fifteenth Day of September, 2015

Michelle K. Lee
*Director of the United States Patent and Trademark Office*